United States Patent
Lee

(10) Patent No.: US 10,768,200 B2
(45) Date of Patent: Sep. 8, 2020

(54) METHOD AND APPARATUS FOR MEASURING THE SPEED OF AN ELECTRONIC DEVICE

(71) Applicant: Samsung Electronics Co., Ltd., Gyeonggi-do (KR)

(72) Inventor: Yong-Seok Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/516,407

(22) Filed: Jul. 19, 2019

(65) Prior Publication Data

US 2019/0339302 A1    Nov. 7, 2019

Related U.S. Application Data

(63) Continuation of application No. 14/875,920, filed on Oct. 6, 2015, now Pat. No. 10,359,445.

(30) Foreign Application Priority Data

Oct. 10, 2014    (KR) .......................... 10-2014-0136787

(51) Int. Cl.
*G01P 21/02*    (2006.01)
(52) U.S. Cl.
CPC ..................................... *G01P 21/02* (2013.01)
(58) Field of Classification Search
None
See application file for complete search history.

(56) References Cited

U.S. PATENT DOCUMENTS

| | | | |
|---|---|---|---|
| 5,828,585 A | 10/1998 | Welk et al. | |
| 6,353,796 B1 | 3/2002 | Schipper et al. | |
| 6,708,115 B1 | 3/2004 | Nagasaka et al. | |
| 6,745,143 B1 | 6/2004 | Gronau et al. | |
| 7,254,516 B2 | 8/2007 | Case, Jr. et al. | |
| 7,782,182 B2 | 8/2010 | Magnussen | |
| 9,539,901 B1 | 1/2017 | Clauss et al. | |
| 9,596,570 B1 * | 3/2017 | Cardoso de Moura ..................... G01S 19/07 | |
| 10,359,445 B2 * | 7/2019 | Lee .......................... G01P 21/02 | |
| 2006/0025921 A1 | 2/2006 | Jung et al. | |
| 2007/0270721 A1 | 11/2007 | Ananny et al. | |
| 2008/0214360 A1 | 9/2008 | Stirling et al. | |
| 2010/0036595 A1 | 2/2010 | Coy et al. | |
| 2011/0003665 A1 * | 1/2011 | Burton ................. G04G 17/045 482/9 |
| 2012/0004881 A1 | 1/2012 | Jung et al. | |
| 2012/0116705 A1 | 5/2012 | Wheatley | |

(Continued)

FOREIGN PATENT DOCUMENTS

| KR | 10-2012-0001925 A | 1/2012 |
|---|---|---|
| KR | 10-1229958 B1 | 2/2013 |

*Primary Examiner* — Tan T. Nguyen
(74) *Attorney, Agent, or Firm* — Cha & Reiter, LLC.

(57) ABSTRACT

An electronic device comprising: a sensor; a communication unit; and at least one processor configured to: receive a first speed measurement from the sensor; receive, via the communication unit, speed information transmitted by an external device; calculate at least one correction parameter based on the first speed measurement and the speed information; and adjust a second speed measurement that is received from the sensor based on the correction parameter.

13 Claims, 12 Drawing Sheets

(56) References Cited

U.S. PATENT DOCUMENTS

| | | |
|---|---|---|
| 2013/0166099 A1 | 6/2013 | Van den Bergh |
| 2014/0214316 A1* | 7/2014 | Matsue ................ G01C 22/006 701/412 |
| 2014/0297008 A1 | 10/2014 | Perkins et al. |
| 2015/0285659 A1* | 10/2015 | Curtis .................. G01C 22/006 702/97 |
| 2016/0011228 A1 | 1/2016 | Chakravarty et al. |

* cited by examiner

METHOD AND APPARATUS FOR MEASURING THE SPEED OF AN ELECTRONIC DEVICE

CROSS REFERENCE TO RELATED APPLICATIONS

This application is a Continuation of U.S. patent application Ser. No. 14/875,920 filed on Oct. 6, 2015 which claims the priority under 35 U.S.C. § 119(a) to Korean Application Serial No. 10-2014-0136787, which was filed in the Korean Intellectual Property Office on Oct. 10, 2014, the entire content of which is hereby incorporated by reference.

TECHNICAL FIELD

The present disclosure relates to electronic devices and more particularly to a method and apparatus for measuring the speed of an electronic device.

BACKGROUND

Typically, electronic devices refer to devices that perform specific functions according to programs mounted in the electronic devices, such as home appliances, electronic notebooks, portable media players, mobile communication terminals, tablet PCs, video/audio devices, desktop/laptop computers, vehicle navigation devices, etc. For example, these electronic devices may output stored information as sound or videos. As a degree of integration of the electronic device is increased and ultrahigh-speed and high-capacity wireless communication becomes more common, a variety of functions have been recently mounted in a single mobile communication terminal.

For example, an entertainment function such as games, a multimedia function such as music/video playback, a communication and security function for mobile banking or the like, a scheduling or electronic wallet function, etc., as well as a communication function have been integrated in a single electronic device.

In addition, a variety of sensors are provided in the electronic device, whereby a variety of services using sensed information are provided.

SUMMARY

According to aspects of the disclosure, an electronic device is provided comprising: a sensor; a communication unit; and at least one processor configured to: receive a first speed measurement from the sensor; receive, via the communication unit, speed information transmitted by an external device; calculate at least one correction parameter based on the first speed measurement and the speed information; and adjust a second speed measurement that is received from the sensor based on the correction parameter.

According to aspects of the disclosure, an electronic device is provided comprising: a first sensor; a second sensor; and at least one processor configured to: receive a first speed measurement from the first sensor; receive a second speed measurement from the second sensor; calculate at least one correction parameter based on the first speed measurement and the second speed measurement; and adjust a subsequent speed measurement received from one of the first sensor and the second sensor based on the correction parameter.

According to aspects of the disclosure, a method is provided for measuring the speed of an electronic device, the method comprising: receiving a first speed measurement from a sensor that is built into the electronic device; receiving, by the electronic device, speed information transmitted by an external device; calculating at least one correction parameter based on the first speed measurement and the speed information; and adjusting a second speed measurement that is received from the sensor based on the correction parameter.

According to aspects of the disclosure, a method is provided for measuring the speed of an electronic device, the method comprising: receiving a first speed measurement with a first sensor; receiving a second speed measurement with a second sensor; calculating at least one correction parameter based on the first speed measurement and the second speed measurement; and adjusting a subsequent speed measurement received from one of the first sensor and the second sensor based on the correction parameter.

According to aspects of the disclosure, a non-transitory computer-readable medium is provided that stores one or more processor-executable instructions, which when executed by at least one processor, cause the at least one processor to perform a method comprising: receiving a first speed measurement from a sensor; receiving speed information transmitted by an external device; calculating at least one correction parameter based on the first speed measurement and the speed information; and adjusting a second speed measurement that is received from the sensor based on the correction parameter.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
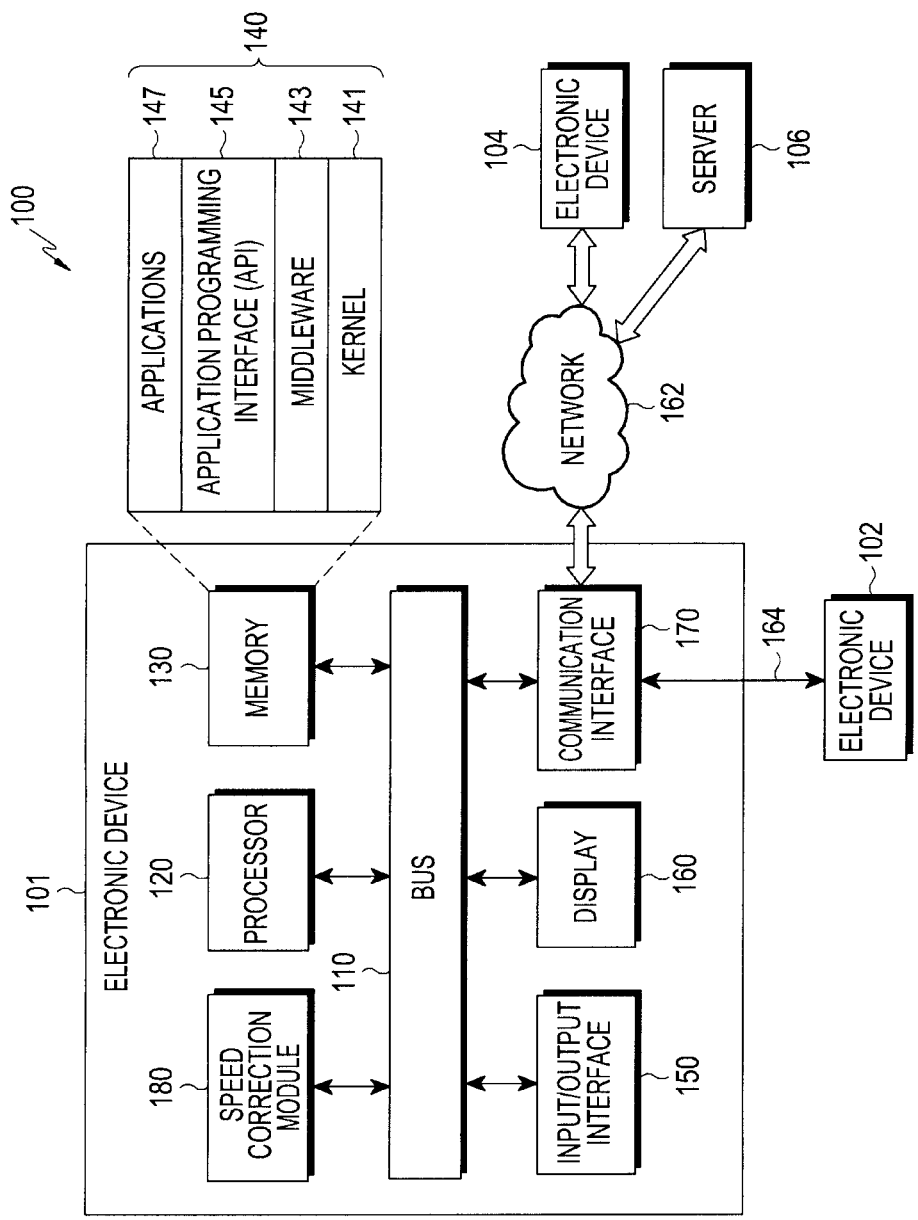
FIG. 1 is a diagram of an example of a network environment according to an embodiment of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

In the present disclosure, the expression "have", "may have", "include" or "may include" refers to existence of a corresponding feature (e.g., numerical value, function, operation, or components such as elements), and does not exclude existence of additional features.

In the present disclosure, the expression "A or B", "at least one of A or/and B", or "one or more of A or/and B" may include all possible combinations of the items listed. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments of the present disclosure may modify various components regardless of the order and/or the importance but does not limit the corresponding components. The above expressions are used merely for the purpose of distinguishing an element from the other elements. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no element (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a general-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

According to some embodiments, the electronic device may be a smart home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic device for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

With reference to FIG. 1, according to various embodiments of the present disclosure, an electronic device 101 within a network environment 100 will be described. The electronic device 101 may include one or more of a bus 110, a processor 120, a memory 130, an I/O (input/output) interface 150, a display 160, a communication interface 170, and a speed correction module 180. In some embodiments, the electronic device 101 may omit at least one of the above-described components or additionally include other components.

The bus 110 may include, for example, a circuit that interconnects the above-described components 110 to 180 and carries communications (e.g., control message and/or data) between the above-described components.

The processor 120 may include any suitable type of processing circuitry, such as one or more general purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. In operation, the processor 120 may execute calculation or data processing associated with control and/or communication of, for example, one or more other components of the electronic device 101.

The memory 130 may include any suitable type of volatile or non-volatile memory, such as Random Access Memory (RAM), Read-Only Memory (ROM), Network Accessible Storage (NAS), cloud storage, a Solid State Drive (SSD), etc. In operation, the memory 130 may store a software and/or program 140. The program 140 may include, for example, a kernel 141, a middleware 143, an API (Application Programming Interface) 145, and/or an application program (or "application") 147. At least a part of the kernel 141, the middleware 143, and the API 145 may be referred to as an OS (Operating System).

The kernel 141 may control or manage, for example, system resources (e.g., the bus 110, the processor 120, the memory 130, etc.) used to execute operations or functions implemented in other programs (e.g., the middleware 143, the API 145, or the application program 147). Furthermore, the kernel 141 may provide an interface for allowing the middleware 143, the API 145, and/or the application program 147 to access individual components of the electronic device 101 in order to control or manage the system resources.

The middleware 143 may serve as an intermediary so that, for example, the API 145 or the application program 147 communicates with the kernel 141 to exchange data. In addition, the middleware 143 may perform control (e.g., scheduling or load balancing) with respect to operation requests received from the application programs 147 by using, for example, a method of assigning a priority for using system resources (e.g., the bus 110, the processor 120, the memory 130, and/or the like) of the electronic device 101 to one or more applications of the application programs 147, in connection with the operation requests.

The API 145, which is an interface for allowing an application 147 to control a function provided by the kernel 141 or the middleware 143, may include at least one interface or function (e.g., command) for file control, window control, image processing, character control, and/or the like.

The I/O interface 150 may serve as an interface capable of transmitting commands or data input from, for example, a user or other external devices to other component(s) of the electronic device 101. Furthermore, the I/O interface 150 may output the commands or data received from the other component(s) of the electronic device 101 to the user or the other external devices.

The display 160 may include, for example, an LCD (Liquid Crystal Display), an LED (Light Emitting Diode) display, an OLED (Organic LED) display, an MEMS (microelectromechanical systems) display, an electronic paper display, and the like. The display 160 may display, for example, various contents (e.g., text, image, video, icon, symbol, etc.) to a user. The display 160 may include a touch screen, and receive a touch, gesture, proximity, or hovering input using, for example, a part of an electronic pen or a user's body.

The communication interface 170 may set, for example, communication between the electronic device 101 and an external device (e.g., an electronic device 102, an electronic device 104, or a server 106). For example, the communication interface 170 may be connected to a network 162 via wireless communication or wired communication to communicate with the external device (e.g., the electronic device 104 or the server 106).

The wireless communication, which serves as, for example, a cellular communication protocol, may use at least one of, for example, LTE, LTE-A, CDMA, WCDMA, UMTS, WiBro, and GSM. The wired communication may include at least one of, for example, an USB (Universal Serial Bus), an HDMI (High Definition Multimedia Interface), an RS-232 (Recommended Standard 232), and a POTS (Plain Old Telephone Service). The network 162 may include at least one of a telecommunications network, for example, a computer network (e.g., LAN or WAN), the internet, and a telephone network.

Each of the electronic devices 102 and 104 may be the same or a different kind of device as or from the electronic device 101. According to one embodiment, the server 106 may include a group of one or more servers. According to various embodiments, all or some of operations executed in the electronic device 101 may be executed in another electronic device or a plurality of other electronic devices (e.g., the electronic devices 102 and 104, or the server 106). According to an embodiment, when the electronic device 101 is required to perform any function or service automatically or by a request, the electronic device 101 may request at least partial function associated with the function or the service from other devices (e.g., the electronic devices 102 and 104 or the server 106) additionally or in place of executing the function or the service by itself. The other electronic devices (e.g., the electronic devices 102 and 104 or the server 106) may execute the requested function or additional function, and transmit the execution result to the electronic device 101. The electronic device 101 may process the received result as is or additionally, and provide the requested function or service. For this, for example, a cloud computing technology, a distributed computing technology, or a client-server computing technology may be used.

In FIG. 1, a case in which the electronic device 101 includes a communication interface 170 to communicate with the electronic device 104 or the server 106 over the network 162 is shown, but according to various embodiments of the present disclosure, the electronic device 101 may be implemented to independently operate without a separate communication function.

According to one embodiment, the server 106 may support the driving of the electronic device 101, by performing at least one of operations (or functions) implemented in the electronic device 101. For example, the server 106 may include a speed correction server module (not shown)

capable of supporting a speed correction module 180 implemented in the electronic device 101. For example, the speed correction server module may include one or more components of the speed correction module 180, and perform (or replace) at least one of operations (or functions) performed by the speed correction module 180. In addition, according to various embodiments, the server 106 may store one or more pieces of correction parameter information for speed correction for each user in a database, and provide the correction parameter information of the corresponding user in response to a request of each of the electronic devices 101 and 102.

The speed correction module 180 may process at least a part of information acquired from other components (e.g., the processor 120, the memory 130, the I/O interface 150, the communication interface 170, etc.), and provide the processed information to the user in various ways.

For example, according to various embodiments of the present disclosure, the speed correction module 180 may correct a speed measured from one or more speed measurement sensors using the set or stored correction parameters, and thereby provide an accurate speed. For example, when speed measurement is required from the electronic device 101, the speed correction module 180 may calculate one or more correction parameters based on a speed value measured from the speed measurement sensor provided in the electronic device 101 and speed information measured by one or more external devices that are connected to the electronic device 101 via one or more network connections (e.g., a Bluetooth connection, a TCP/IP connection, etc.). Afterwards, the electronic device 101 may use the calculated correction parameter to adjust subsequently-taken speed measurements, and thereby provide an accurate speed value.

In addition, the correction parameter calculated based on the speed correction module 180 may be transmitted to the server 106 via the network 162, and the transmitted correction parameter may be stored and managed in the server 106 for each user. For example, according to various embodiments of the present disclosure, when a user desires to use another electronic device 101 due to the replacement or loss of the electronic device 101, the correction parameter of the corresponding user, which is stored in advance, may be received from the server 106 to provide accurate speed information. Additional information about the speed correction module 180 will be provided in the discussion with respect to FIG. 2.

In FIG. 1, the speed correction module 180 is shown as a separate module from the processor 120, but at least some functions of the speed correction module 180 may be included in the processor 120 or at least another module to be implemented, or the overall functions of the speed correction module 180 may be included in the shown processor 120 or another processor to be implemented.

Figure 2:
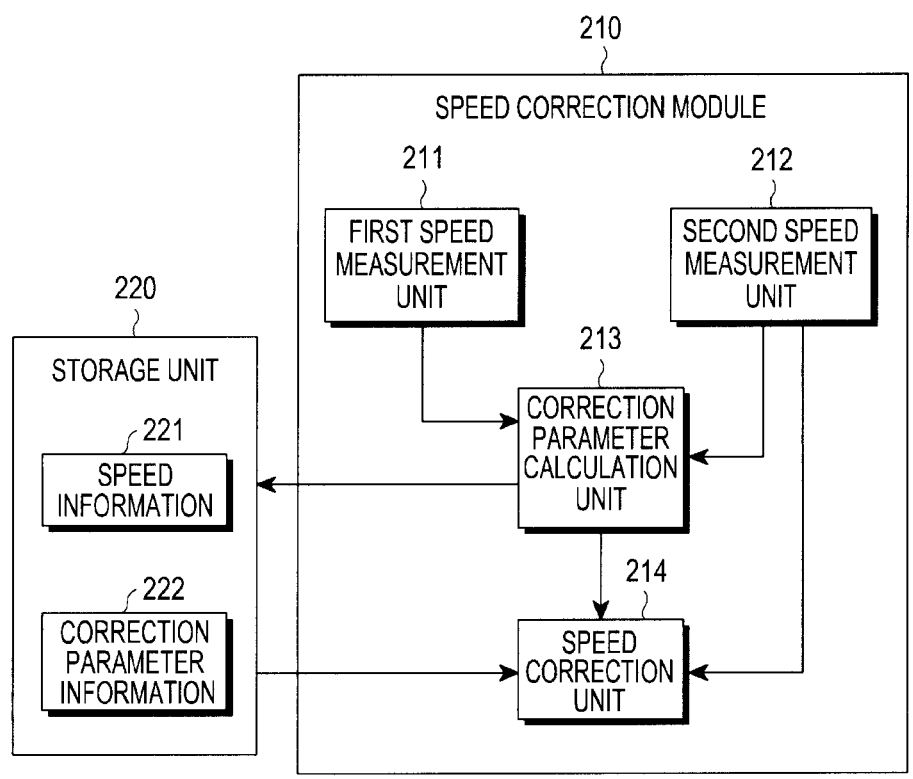
FIG. 2 is a block diagram of an example of an electronic device according to an embodiment of the present disclosure.

FIG. 2 is a block diagram of an example of an electronic device (e.g., electronic device 101 including the speed correction module 180 of FIG. 1) according to various embodiments of the present disclosure. In this example, the speed correction module 180 is executed within the processor 120. One or more configurations included in the speed correction module 210 of FIG. 2 may be included in the speed correction module 180 or the processor 120 of FIG. 1.

Referring to FIG. 2, the electronic device may include at least one of a speed correction module 210 and a storage unit 220.

According to various embodiments of the present disclosure, the speed correction module 210 may include at least one of a first speed measurement unit 211, a second speed measurement unit 212, a correction parameter calculation unit 213, and a speed correction unit 214.

Each of the first speed measurement unit 211 and the second speed measurement unit 212 may include one or more sensors (e.g., a GPS module, an acceleration sensor, a gyro sensor, or the like) that can directly or indirectly measure a movement speed of the electronic device. According to various embodiments of the present disclosure, each of the first speed measurement unit 211 and the second speed measurement unit 212 may include a different sensor. In addition, according to various embodiments of the present disclosure, the first speed measurement unit 211 and the second speed measurement unit 212 may include the same sensor, but calculate the speed in different ways. Speed information calculated by each of the speed measurement units 211 and 212 may be stored in the storage unit 220 as the speed information 221.

In operation, the first speed measurement unit 211 may measure the speed using the GPS module, and the second speed measurement unit 212 may measure the speed using the acceleration sensor will be described. The correction parameter calculation unit 213 may calculate one or more correction parameters based on the speed information calculated from each of the first and second speed measurement units 211 and 212 at the same time or the same time interval. The correction parameter may include any suitable number and/or alphanumerical string that can be used to adjust or modify a speed measurement in order to increase its accuracy. The correction parameter calculated by the correction parameter calculation unit 213 may be stored in the storage unit 220 as correction parameter information 222. In some implementations, the correction parameter may be calculated by performing regression analysis on data collected by using the first and second speed measurement units. This will be described in detail later.

In some aspects, the first speed measurement unit 211 may be more accurate than the second speed measurement unit 212. For this reason, when the correction parameter is calculated as described above, subsequent speed measurements taken by the second speed measurement unit the adjusted by using the correction parameter in order to improve their accuracy.

A speed value measured by the first speed measurement unit 211 may be assumed to be a more accurate value than a speed value measured by the second speed measurement unit 212. According to various embodiments of the present disclosure, when the correction parameter is calculated as described above, the speed value measured by the second speed measurement unit 212 may be corrected using the correction parameter even when the accurate speed value is not measured through the first speed measurement unit 211 thereafter, whereby it is possible to provide the accurate speed value.

The speed correction unit 214 may receive the measured speed value from the second speed measurement unit 212, and correct the provided speed value using the correction parameter information 222 stored in the storage unit 220 or the correction parameter calculated by the correction parameter calculation unit 213, thereby providing the accurate speed value.

Figure 3:
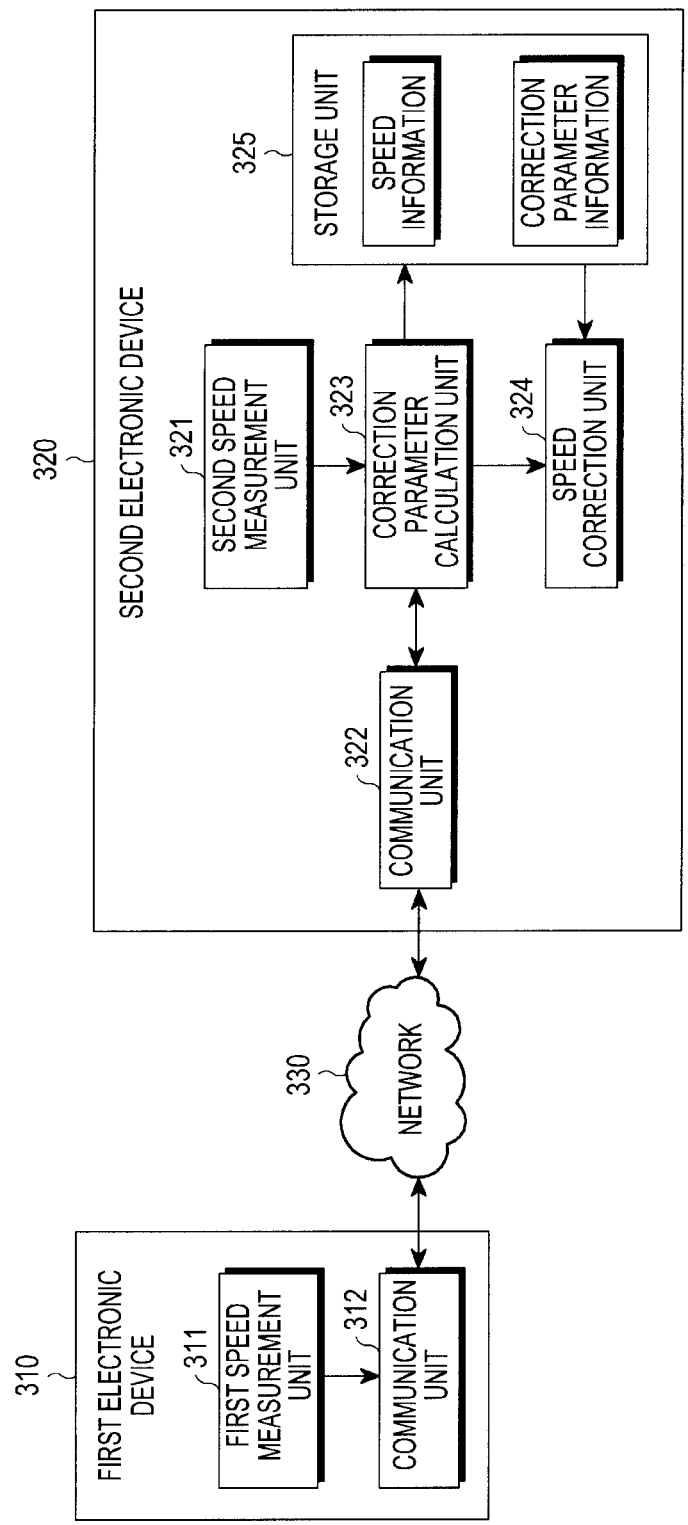
FIG. 3 is a block diagram of an example of a system according to various embodiments of the present disclosure.

FIG. 3 is a block diagram of an example of a system according to various embodiments of the present disclosure. Referring to FIG. 3, a first electronic device 310 may include a first speed measurement unit 311 and a communication unit 312. The second electronic device 320 may include at least one of a second speed measurement unit 321, a communication unit 322, a correction parameter calculation unit 323, a speed correction unit 324, and a storage unit 325.

Each of the first speed measurement unit 311 and the second speed measurement unit 321 may include one or more sensors (e.g., a GPS module, an acceleration sensor, a gyro sensor, or the like) that can directly or indirectly measure a movement speed of the electronic device. According to various embodiments of the present disclosure, each of the first speed measurement unit 311 and the second speed measurement unit 321 may include a different sensor. In addition, according to various embodiments of the present disclosure, the first speed measurement unit 311 and the second speed measurement unit 321 may include the same sensor, but calculate the speed in different ways. Speed information calculated by each of the first and second speed measurement units 311 and 321 may be stored in the storage unit 325. In operation, the first speed measurement unit 311 may measure the speed using the GPS module, and the second speed measurement unit 321 may measure the speed using the acceleration sensor will be described. However, embodiments of the present disclosure are not limited to the above-described specific sensor.

Speed information measured in real-time by the first speed measurement unit 311 of the first electronic device 310 may be transmitted over a network 330 by the communication unit 312. The second electronic device 320 may be connected to the network 330 via the communication unit 322, and receive the speed information transmitted from the first electronic device 310 by using the communication unit 322. The second speed measurement unit 321 may measure the speed of the second electronic device 320 in real-time. When a user moves while simultaneously carrying the first electronic device 310 and the second electronic device 320, ideally, the speed value measured by the first speed measurement unit 311 of the first electronic device 310 and the speed value measured by the second speed measurement unit 321 of the second electronic device 320 may be the same. However, due to the types of the sensors of the first and second speed measurement units 311 and 321, a speed calculation method, an error between the sensors, or the like, the measurements taken by the speed measurement units 311 and 321 may be different from one another.

In addition, according to various embodiments of the present disclosure, when the first speed measurement unit 311 includes the GPS module to measure the speed using the GPS module and the second speed measurement unit 321 measures the speed using the acceleration sensor, the speed value measured by the first speed measurement unit 311 may be more accurate than the speed value measured by the second speed measurement unit 321.

The correction parameter calculation unit 323 may calculate one or more correction parameters based on the speed information calculated by using each of the first and second speed measurement units 311 and 321 at the same time or the same time interval. According to aspects of the disclosure, the correction parameter may include any suitable number and/or alphanumerical string that can be used to adjust or modify a speed measurement in order to increase its accuracy. The correction parameter calculated by the correction parameter calculation unit 323 may be stored in the storage unit 325 as correction parameter information. For example, it is possible to apply a regression analysis method for the correction. This will be described in detail later.

In addition, according to various embodiments of the present disclosure, when a connection (e.g., a Bluetooth connection) is established between the first electronic device 310 and the second electronic device 320, the second electronic device 320 may receive, from the first electronic device 310, a plurality of speed values measured by the first electronic device 310 and a respective timestamp for each of the speed values that indicates when that speed value was measured. The received speed values and timestamps may be stored in the storage unit 325. Thereafter, when the speed value measured by the second speed measurement unit 321 exists at the same time among the received speed values, the correction parameter may be calculated based on one or more pairs of speed measurements taken by the first and second electronic devices. Wherein each speed measurement in a given pair is taken by a different one of the first and second electronic devices at corresponding time instants (e.g., at the same time, at approximately the same time, or within a predetermined time period).

In some aspects, the first speed measurement unit 311 (of the first electronic device) may be more accurate value than the second speed measurement unit 321 (of the second electronic device). According to various embodiments of the present disclosure, when the correction parameter is calculated as described above, speed measurements that are subsequently taken by using the second speed measurement unit 321 may be adjusted using the correction parameter in order to improve their accuracy.

The speed correction unit 324 may receive the measured speed value from the second speed measurement unit 321, and correct the provided speed value using the correction parameter information stored in the storage unit 325 or the correction parameter calculated by the correction parameter calculation unit 323, thereby providing the accurate speed value.

The network 330 may include at least one of a telecommunications network, for example, a computer network (e.g., LAN or WAN), the Internet, and a telephone network. In addition, the network 330 may include a short-range communication network. For example, the network 330 may include a cellular network, a Wi-Fi network, a Bluetooth network, and the like.

Figure 4:
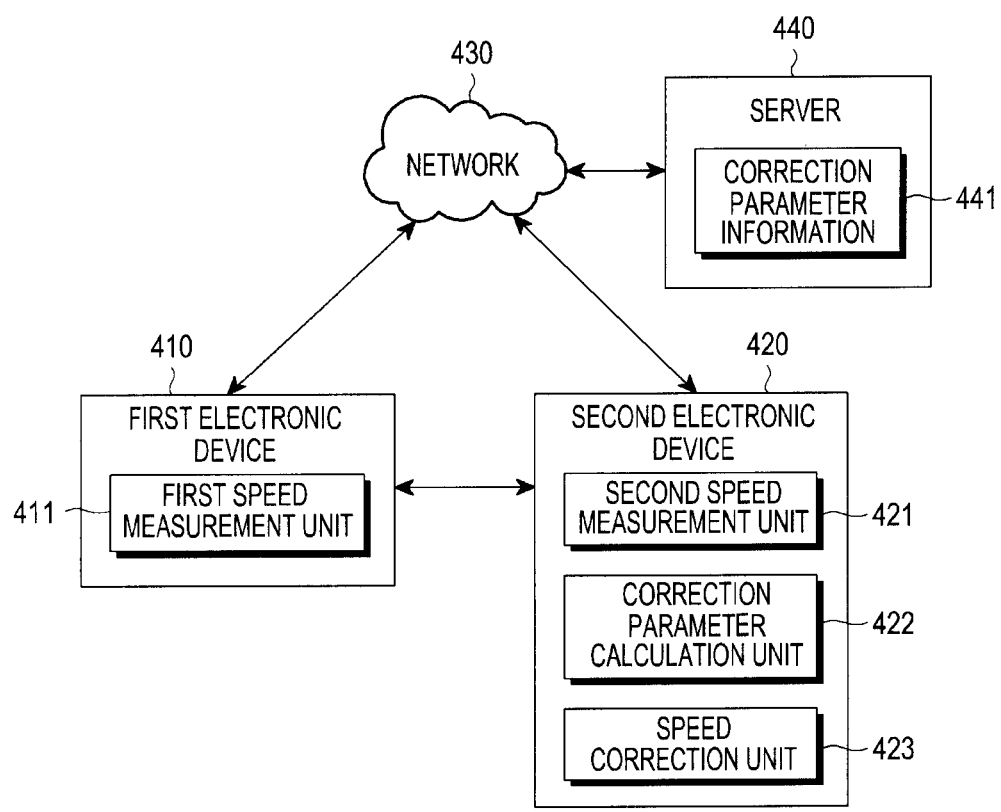
FIG. 4 is a block diagram of an example of a system according to various embodiments of the present disclosure.

FIG. 4 is a block diagram of an example of a system according to various embodiments of the present disclosure. Referring to FIG. 4, the system according to various embodiments of the present disclosure may include a first electronic device 410, a second electronic device 420, a network 430, and a server 440.

The first electronic device 410 may include a first speed measurement unit 411. The second electronic device 420 may include at least one of a second speed measurement unit 421, a correction parameter calculation unit 422, and a speed correction unit 423. Each of the first speed measurement unit 411 and the second speed measurement unit 421 may include one or more sensors (e.g., a GPS module, an acceleration sensor, a gyro sensor, or the like) that can directly or indirectly measure a movement speed of the electronic device. According to various embodiments of the present disclosure, each of the first speed measurement unit 411 and the second speed measurement unit 421 may include a different sensor. In addition, according to various embodiments of the present disclosure, the first speed measurement unit 411 and the second speed measurement unit 421 may include the same sensor, but calculate the speed in different ways. Speed information calculated by the first speed measurement unit 411 or the second speed measurement unit 421 may be transmitted to the server 440 via the network 430, and stored in a database. In operation, the first speed measurement unit 411 may measure the speed using the GPS module, and the second speed measurement unit 421 measures the speed using the acceleration sensor will be described. However, embodiments of the present disclosure are not limited to the above-described specific sensor.

The speed information measured in real-time by the first speed measurement unit 411 of the first electronic device 410 may be transmitted to the second electronic device 420 via the network 430. The second electronic device 420 may receive the speed information transmitted from the first electronic device 410 via a wired/wireless network.

The second speed measurement unit 421 of the second electronic device 420 may measure the speed of the second electronic device 420 in real-time. When a user moves while simultaneously carrying the first electronic device 410 and the second electronic device 420, ideally, the speed value measured by the first speed measurement unit 411 of the first electronic device 410 and the speed value measured by the second speed measurement unit 421 of the second electronic device 420 may be the same. However, due to the types of the sensors of the first and second speed measurement units 411 and 421, a speed calculation method, an error between the sensors, or the like, there may be a difference between the measured speed values.

In addition, according to various embodiments of the present disclosure, when the first speed measurement unit 411 includes the GPS module to measure the speed using the GPS module and the second speed measurement unit 421 measures the speed using the acceleration sensor, the speed value measured by the first speed measurement unit 411 may be more accurate than the speed value measured by the second speed measurement unit 421.

The correction parameter calculation unit 422 may calculate one or more correction parameters through the speed information calculated from each of the first and second speed measurement units 411 and 421 at the same time or the same time interval. According to aspects of the disclosure, the correction parameter may include any suitable number and/or alphanumerical string that can be used to adjust or modify a speed measurement in order to increase its accuracy. The correction parameter calculated by the correction parameter calculation unit 422 may be transmitted to the server 440 via the network 430. The server 440 may store correction parameter information 441 transmitted from the second electronic device 420 of each user, for each user.

In addition, according to various embodiments of the present disclosure, when a connection (e.g., a Bluetooth connection) is established between the first electronic device 410, the second electronic device 420 may receive, from the first electronic device 410, a plurality of speed values measured by the first electronic device 410 and a respective timestamp for each of the speed values that indicates when that speed value was measured. Thereafter, when the speed value measured by the second speed measurement unit 421 exists at the same time among the speed values received from the first electronic device 410, the correction parameter may be calculated based on one or more pairs of speed measurements taken by the first and second electronic devices. Wherein each speed measurement in a given pair is taken by a different one of the first and second electronic devices at corresponding time instants (e.g., at the same time, approximately the same time, or within a predetermined time period).

In some aspects, the first speed measurement unit 411 (of the first electronic device) may be more accurate than the second speed measurement unit 421 (of the second electronic device). According to various embodiments of the present disclosure, when the correction parameter is calculated as described above, the correction may be used to correct any speed measurements that are subsequently taken by using the second speed measurement unit in order to improve their accuracy.

The speed correction unit 423 may receive the measured speed value from the second speed measurement unit 421, and correct the provided speed value using the correction parameter information 441 stored in the server 440 or the correction parameter calculated by the correction parameter calculation unit 422, thereby providing the accurate speed value.

In addition, according to various embodiments of the present disclosure, when a user desires to measure the speed using another electronic device other than the electronic device (e.g., the second electronic device 420) that has calculated the correction parameter, the correction parameter information 441 about the corresponding user may be received from the server 440, thereby providing the accurate speed.

For example, when the second speed measurement unit 421 includes the acceleration sensor, the acceleration sensor may have a different error depending on a movement pattern of the user. Accordingly, the correction parameter information may be stored and used in the server 440 for each user, and therefore it is possible to receive a highly accurate speed value even when the same user measures the speed using a different electronic device.

An electronic device according to any one of various embodiments of the present disclosure may include: a speed measurement module that measures a speed; a communication unit that receives speed information from an external device; and a processor that calculates one or more correction parameters based on the received speed information and the measured speed, and corrects the speed measured by the speed measurement module using the calculated correction parameter.

According to various embodiments of the present disclosure, the speed measurement module may include an acceleration sensor.

According to various embodiments of the present disclosure, the received speed information may be speed information measured by a GPS sensor.

According to various embodiments of the present disclosure, the correction parameter may be a correction parameter determined by a regression analysis method.

According to various embodiments of the present disclosure, the processor may calculate the correction parameter at a point in time when the electronic device is connected to the external device.

According to various embodiments of the present disclosure, the electronic device may be a wearable device.

According to various embodiments of the present disclosure, the external device may be a smartphone or a treadmill.

According to various embodiments of the present disclosure, when the electronic device is connected to the external device and a movement of the electronic device or the external device satisfies a set condition, the processor may calculate the correction parameter.

According to various embodiments of the present disclosure, the processor may process the calculated correction parameter to be transmitted to a server via the communication unit.

An electronic device according to any one of various embodiments of the present disclosure may include: a first speed measurement module that measures a speed by a first sensor; a second speed measurement module that measures a speed by a second sensor; and a processor that calculates one or more correction parameters based on the speed measured by the first sensor and the speed measured by the second sensor, and corrects the speed measured by at least one of the first sensor and the second sensor using the calculated correction parameter.

Hereinafter, a method for correcting a speed in the above-described electronic device will be described in detail with reference to FIGS. 5 to 8.

Figure 5:
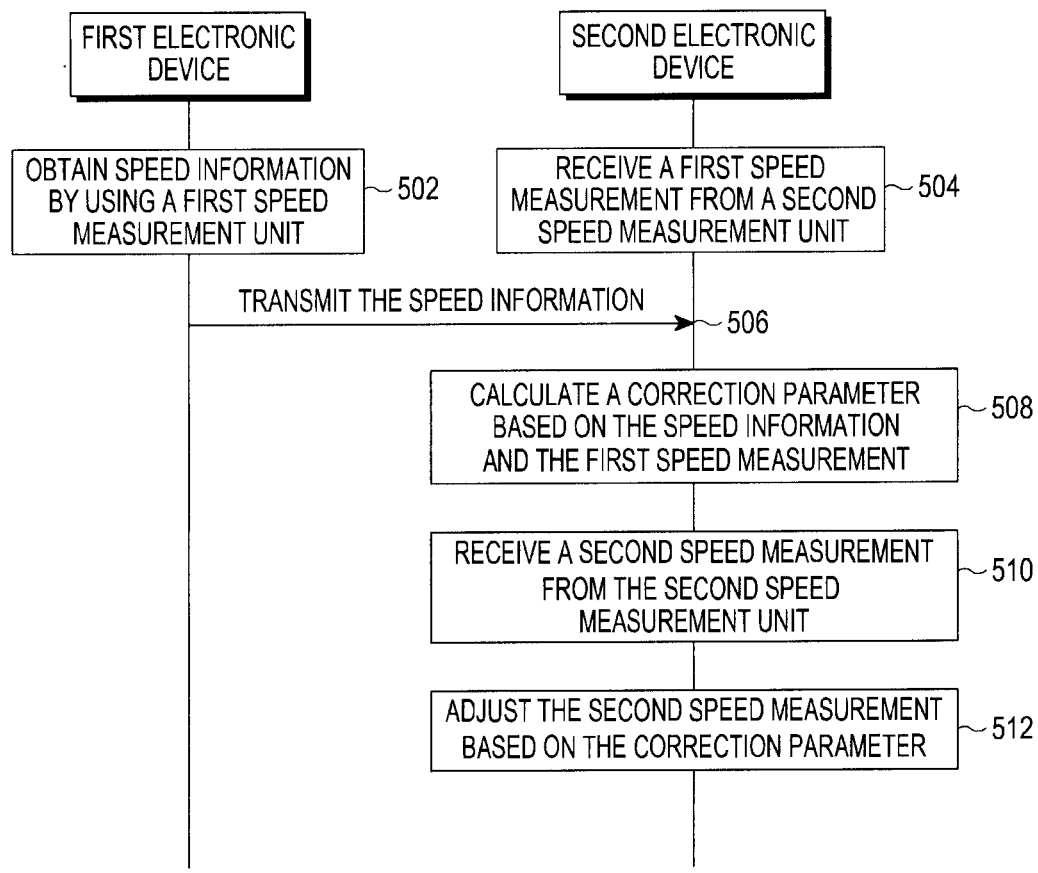
FIG. 5 is a sequence diagram of an example of a process according to various embodiments of the present disclosure.

FIG. 5 is a sequence diagram of an example of a process according to various embodiments of the present disclosure. Referring to FIG. 5, in operation 502, a first speed measurement unit of a first electronic device may obtain speed information. In operation 504, a second speed measurement unit of the second electronic device may take a first speed measurement (e.g., detect a first speed value).

In operation 506, speed information measured by the first speed measurement unit may be transmitted from the first electronic device to the second electronic device.

In operation 508, a correction parameter may be calculated based on the speed information received from the first electronic device and the first speed measurement.

In operation 510, a second speed measurement may be taken by the second speed measurement unit (e.g., detect a second speed value). And finally, at operation 512, the second speed measurement may be adjusted using the calculated correction parameter.

Figure 6:
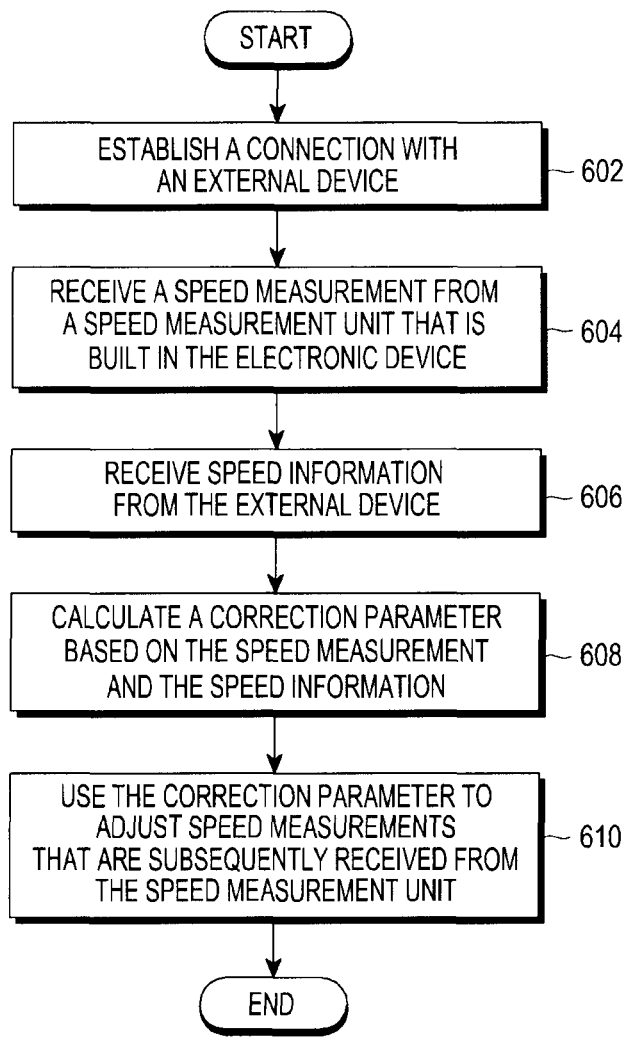
FIG. 6 is a flowchart of an example of a process according to various embodiments of the present disclosure.

FIG. 6 is a flowchart of an example of process according to various embodiments of the present disclosure. Referring to FIG. 6, in operation 602, the electronic device may be connected to the external device. For example the electronic device may be connected to the electronic device via any suitable type of connection, such as a Bluetooth connection, a switched network connection, etc.

In operation 604, the electronic device may receive a speed measurement (e.g., detect a speed value) from the electronic device's speed measurement unit.

In operation 606, the electronic device may receive speed information from the external device over the connection.

In operation 608, a correction parameter may be calculated using the speed information received from the external device and the speed measurement.

In operation 610, speed measurements that are subsequently received from the electronic device's speed measurement unit may be adjusted using the calculated correction parameter.

According to various embodiments of the present disclosure, when the electronic device is connected to the external device, speed information measured by the external device may be received. The received speed information may include at least one of (i) a speed measurement obtained by the external device when a connection is established between the electronic device and the external device, and (ii) one or more speed measurements obtained prior to the connection being established along with a respective timestamp for each speed measurement that indicates a time when the speed measurement was obtained.

When speed measurements are received from the external device, the received speed measurements may be compared with speed measurements taken by the electronic device at a corresponding time instant (e.g., speed measurements that are taken at the same or approximately the same time as the received speed measurements and/or speed measurements taken during a predetermined time period), and the correction parameter may be calculated based on the outcome of the comparison.

A method for calculating the correction parameter may be implemented in various ways. For example, the correction parameter may be calculated by performing regression analysis on speed measurements taken by the electronic device and the external electronic device.

The regression analysis method corresponds to one field of the inferential statistics that analyze a dependence relationship between an arbitrary variable and one or more other variables and thereby analyze a relationship between two or more variables, particularly, a causal relationship between variables. The regression analysis method may determine a mathematical linear function formula having a change in a specific variable value and changes in other variable values to deduce a correlation, and the deduced function formula is referred to as a regression equation.

Through such a regression equation, information regarding what kind of relationship is present between the change in the specific variable (referred to as an independent variable or an explanatory variable) and the change in the other variables (referred to as dependent variables), the relationship is caused by the change in what kind of variable when the relationship is present, the change in what kind of variable is the resulting symptoms, and the like may be analyzed.

For example, by analyzing the correlation between speed measurements taken by the first speed measurement unit (e.g., a component for measuring the speed by the GPS module) and speed measurements taken by the second speed measurement unit (e.g., a component for measuring the speed by the acceleration unit), a function formula and/or parameters may be calculated.

For example, when a speed measurement taken by the first speed measurement unit (e.g., a component including the GPS module) of the first electronic device (e.g., a smartphone) and a speed measurement taken by the second speed measurement unit (e.g., a component including the acceleration sensor) of the second electronic device (e.g., a wearable device) are the same as the following Table 1, the function formula and/or parameters may be calculated performing regression analysis on data collected by using the first speed measurement unit and the second speed measurement unit.

TABLE 1

| Time | Measurement value (km/h) of first speed measurement unit | Measurement value (km/h) of second speed measurement unit |
| --- | --- | --- |
| T1 | 4 | 5 |
| T2 | 6 | 7.3 |
| T3 | 9 | 11 |

When performing regression analysis on measurement values of Table 1, a function formula of the following Equation 1 may be obtained.

$$V_A = 0.83 \times V_2 - 0.12 \quad \text{[Equation 1]}$$

In Equation 1, $V_A$ denotes an adjusted speed value, and $V_2$ denotes a speed measurement taken by the second speed measurement unit that is being adjusted. As to Equation 1, the speed value ($V_2$) measured by the second speed measurement unit is applied to Equation 1, the adjusted speed value may be calculated. In Equation 1, a correction parameter may be 0.83 or −0.12 which is a coefficient value of each term, but embodiments of the present disclosure are not limited thereto.

Figure 7:
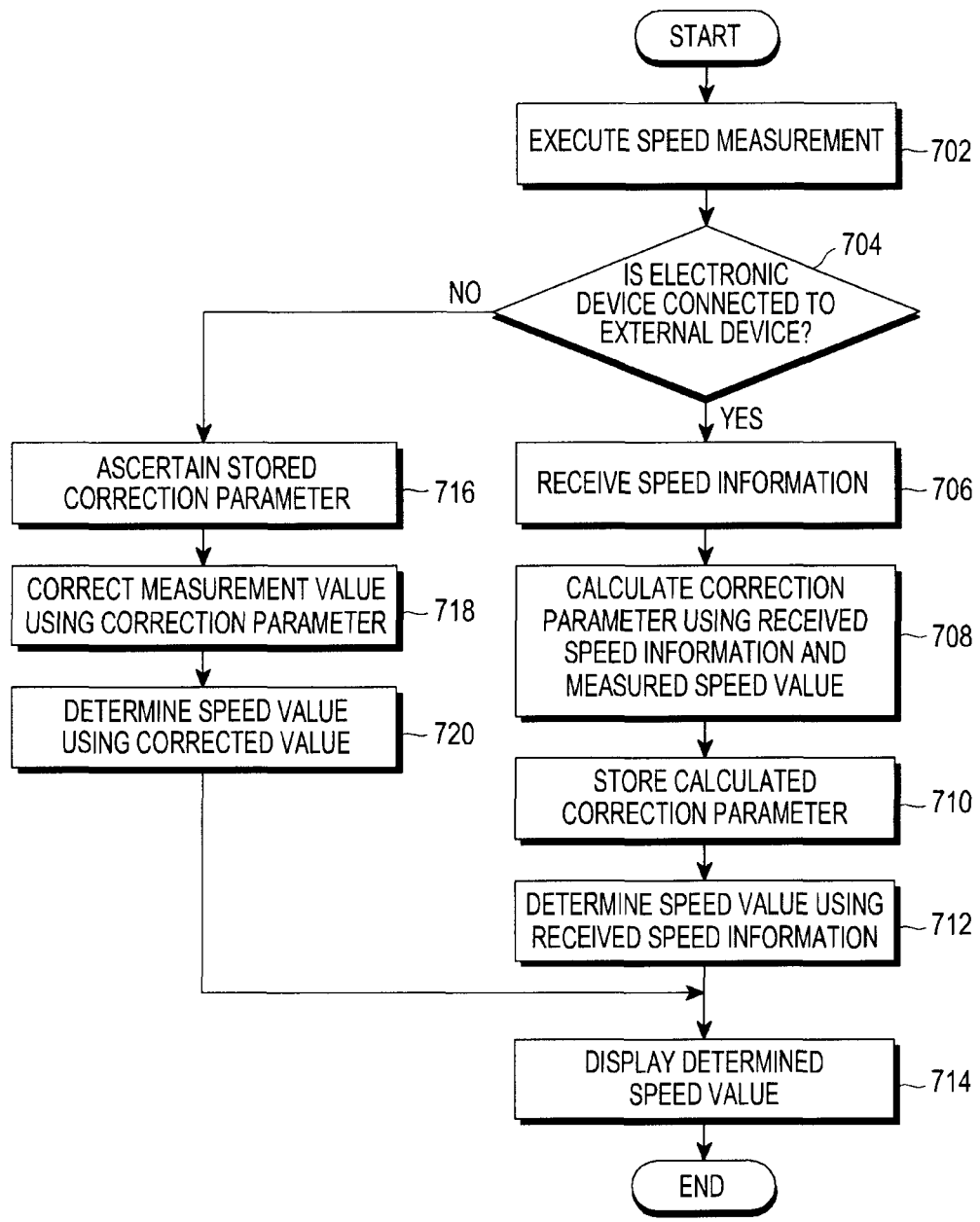
FIG. 7 is a flowchart of an example of a process according to various embodiments of the present disclosure.

FIG. 7 is a flowchart of an example of a process according to various embodiments of the present disclosure. Referring to FIG. 7, when speed measurement is executed in operation 702, a speed may be measured by a provided speed measurement means (e.g., the second speed measurement unit).

When the electronic device is connected to an external device in operation 704, the electronic device may receive speed information from the connected external device in operation 706. In operation 708, the electronic device may calculate a correction parameter using the speed information received from the external device and the measured speed value.

In operation 710, the electronic device may store the calculated correction parameter. In addition, in operation 712, the electronic device may determine the speed value using the speed information received from the external device, and correct the measured speed value using the calculated correction parameter to thereby determine the speed value.

In operation 714, the electronic device may display the determined speed value on a screen of the electronic device.

When the electronic device is not connected to the external device in operation 704, the electronic device may identify a correction parameter stored in advance in operation 716. In operation 718, the electronic device may adjust the measured speed value using the identified correction parameter.

The electronic device may determine the speed value using the adjusted value in operation 720, and display the determined speed value on the screen of the electronic device in operation 714.

Figure 8:
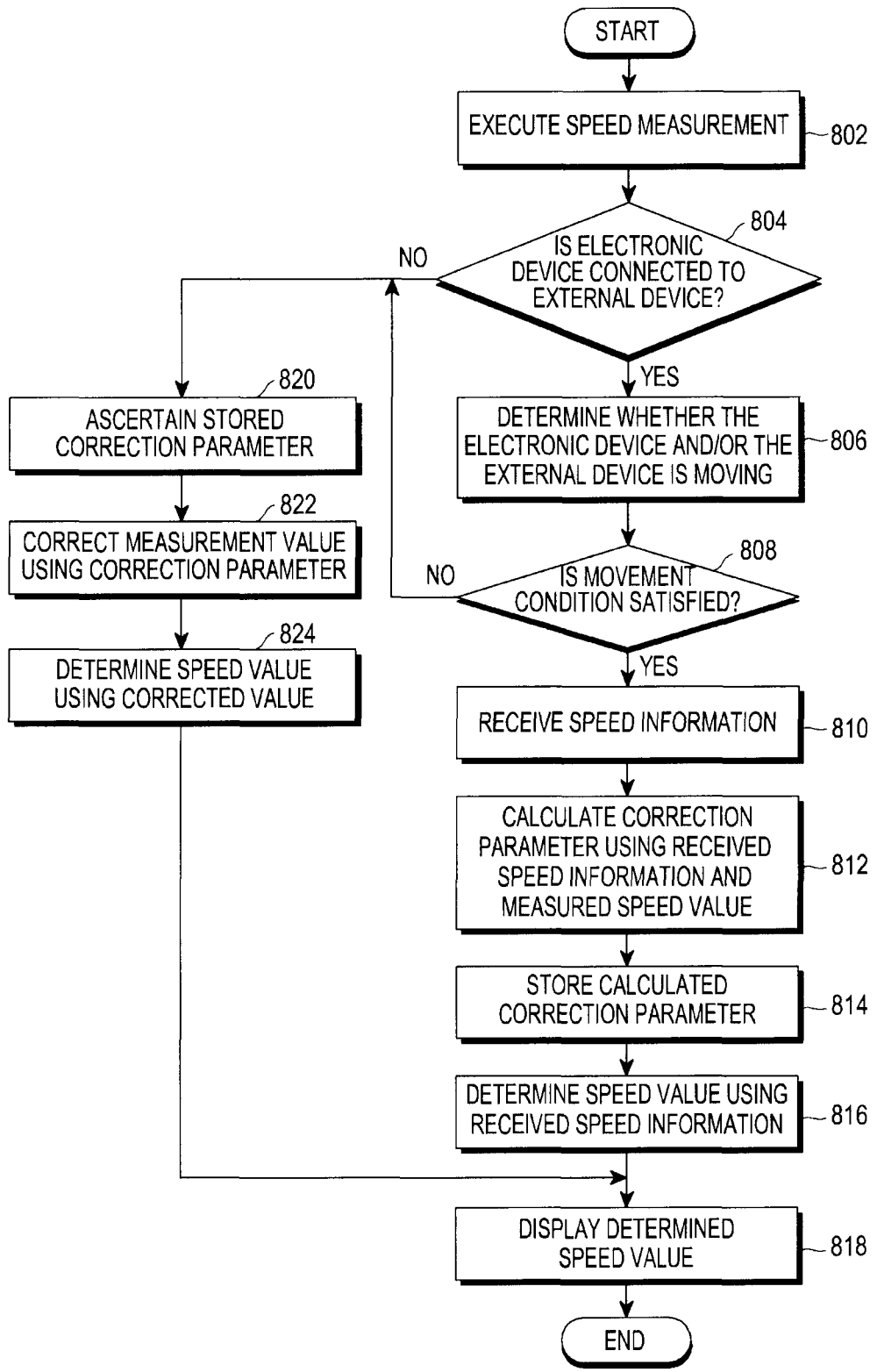
FIG. 8 is a flowchart of an example of a process according to various embodiments of the present disclosure.

FIG. 8 is a flowchart of an example of a process according to various embodiments of the present disclosure. Referring to FIG. 8, when speed measurement is executed in operation 802, the electronic device may measure a speed by a speed provided measurement means (e.g., the second speed measurement unit).

When the electronic device is connected to an external device in operation 804, the electronic device may determine movements of the devices (e.g., determine whether the electronic device and/or the external device is moving) in operation 806. When the movement satisfies a set movement condition in operation 808 based on the determination result (e.g., when it is determined that at least one device is moved or both devices are all moved), the electronic device may receive speed information from the connected external device in operation 810.

In operation 812, the electronic device may calculate a correction parameter using the speed information received from the external device and the measured speed value.

In operation 814, the electronic device may store the calculated correction parameter. In addition, in operation 816, the electronic device may determine the speed value using the speed information received from the external device, and adjust the measured speed value using the calculated correction parameter and thereby determine the speed value.

In operation 818, the electronic device may display the determined speed value on a screen of the electronic device.

When the electronic device is not connected to the external device in operation 804, the electronic device may identify a correction parameter stored in advance in operation 820. In operation 822, the electronic device may correct the measured speed value by the identified correction parameter.

The electronic device may determine the speed value using the adjusted value in operation 824, and display the determined speed value on the screen of the electronic device in operation 818.

When the electronic device is connected to the external device in operation 808, but the movement condition is not satisfied (e.g., when it is determined that both devices are not all moved), the electronic device may identify the correction parameter stored in advance in operation 820. In operation 822, the electronic device may correct the measured speed value by the identified correction parameter.

The electronic device may determine the speed value using the adjusted value in operation 824, and display the determined speed value on the screen of the electronic device in operation 818.

A method for measuring a speed of an electronic device according to any one of various embodiments of the present disclosure includes: measuring a speed by a speed measurement module; receiving speed information from an external device; calculating one or more correction parameters based on the received speed information and the measured speed; and adjusting the speed measured by the speed measurement module using the calculated correction parameter.

According to various embodiments of the present disclosure, the speed measurement module may include an acceleration sensor.

According to various embodiments of the present disclosure, the received speed information may be speed information measured by a GPS sensor.

According to various embodiments of the present disclosure, the correction parameter may be a correction parameter determined by a regression analysis method.

According to various embodiments of the present disclosure, the method for measuring the speed may further include: calculating the correction parameter at a point in time when the electronic device is connected to the external device.

According to various embodiments of the present disclosure, when the electronic device is connected to the external device, and a movement of the electronic device or the external device satisfies a set condition, the method for measuring the speed may further include: calculating the correction parameter.

According to various embodiments of the present disclosure, the method for measuring the speed may further include: transmitting the calculated correction parameter to a server.

According to various embodiments of the present disclosure, the speed information received from the external device may include a speed value measured at a point in time when the electronic device is connected to the external device or speed values previously measured at least one point in time, and the speed information may further include a respective timestamp for each of the measured speed values.

A method for measuring a speed of an electronic device according to any one of various embodiments of the present disclosure includes: measuring a speed by a first sensor of a first speed measurement module; measuring a speed by a second sensor of a second speed measurement module; calculating one or more correction parameters based on the speed measured by the first sensor and the speed measured by the second sensor; and adjusting the speed measured by at least one of the first sensor and the second sensor using the calculated correction parameter.

Figure 9:
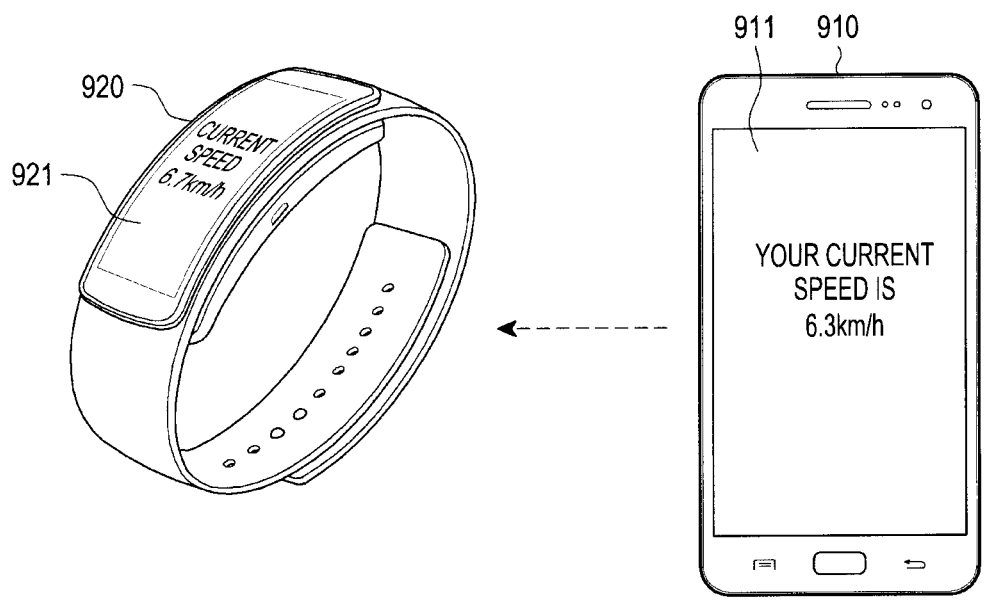
FIG. 9 illustrates is a diagram of an example of a system according to various embodiments of the present disclosure.

FIG. 9 illustrates is a diagram of an example of a system according to various embodiments of the present disclosure. Referring to FIG. 9, when a first electronic device 910 is a smartphone, and a second electronic device 920 is a wearable device (e.g., a watch-like device), speed information measured in the first electronic device 910 may be transmitted to the second electronic device 920.

For example, it may be assumed that a GPS module is provided in the first electronic device 910 so that it is able to measure a relatively accurate speed, and only an acceleration module other than the GPS module is provided in the second electronic device 920 so that it is unable to measure a relatively accurate speed. A speed value measured by the first electronic device 910 may be displayed on a display 911 of the first electronic device 910, and a speed value measured by the second electronic device 920 may be displayed on a display 921 of the second electronic device 920. As described above, the speed values measured by the electronic devices 910 and 920 may be different from each other.

According to various embodiments of the present disclosure, the second electronic device 920 may receive the measured relatively accurate speed information from the first electronic device 910, and analyze a correlation between the received speed information and the speed value measured by the second electronic device 920, thereby calculating a correction parameter.

Thereafter, the second electronic device 920 may adjust the measured speed value using the calculated correction parameter and provides the adjusted speed value to a user, thereby providing more accurate speed information.

Figure 10A:
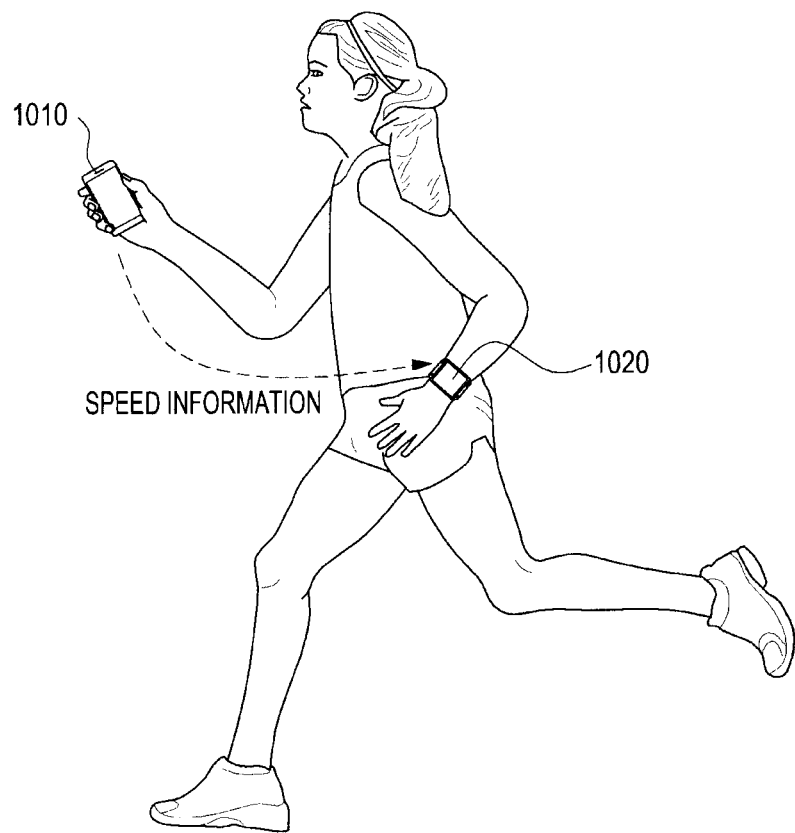
FIG. 10A is a diagram of an example of a system according to various embodiments of the present disclosure.

FIG. 10A is a diagram of an example of a system according to various embodiments of the present disclosure. Referring to FIG. 10A, when a user moves while simultaneously carrying a first electronic device 1010 and a second electronic device 1020, the relatively accurate speed information measured by the first electronic device 1010 according to various embodiments of the present disclosure may be transmitted to the second electronic device 1020.

The second electronic device 1020 may calculate a correction parameter using the speed information received from the first electronic device 1010, and adjust the subsequently measured speed value using the calculated correction parameter, thereby providing a more accurate speed value.

Figure 10B:
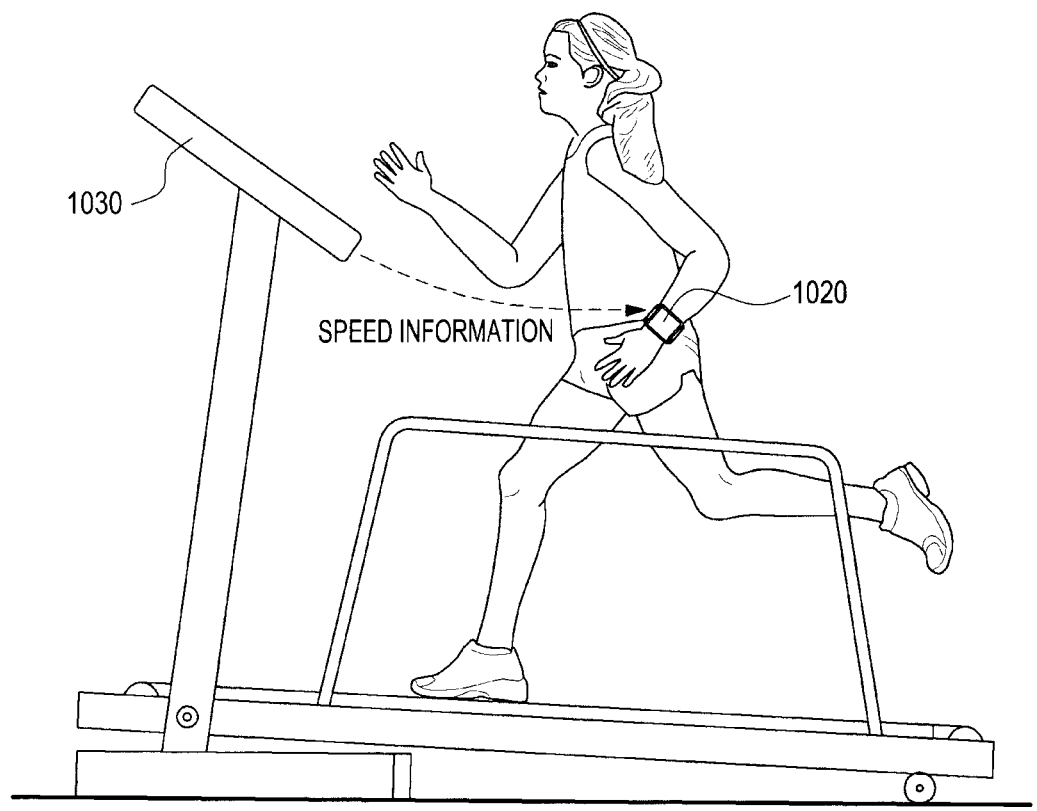
FIG. 10B is a diagram of an example of a system according to various embodiments of the present disclosure.

FIG. 10B is a diagram of an example of a system according to various embodiments of the present disclosure. Referring to FIG. 10B, when a user runs on a treadmill 1030 while wearing a second electronic device 1020 (e.g., a wearable device), relatively accurate speed information measured by the treadmill 1030 may be transmitted to the second electronic device 1020.

The second electronic device 1020 may calculate a correction parameter by the speed information received from the treadmill 1030, and adjust the subsequently measured speed value using the calculated correction parameter, thereby providing a more accurate speed value.

For example, in a case in which the second electronic device 1020 measures the speed value using an acceleration sensor, when a user runs on the treadmill 1030, the acceleration sensor may determine that the user is moving forward, so that a speed at which the user runs on the treadmill may be measured as the speed value. Thus, ideally, the speed value measured by the accelerometer of the second electronic device 1020 and the speed value measured by the movement of a rail of the treadmill 1030 should be the same, but the speed value measured by the treadmill 1030 may be more accurate. According to various embodiments of the present disclosure, the speed value measured by the treadmill 1030 may be transmitted to the second electronic device 1020, whereby it is possible to correct an error of the speed value measured by the accelerometer.

Figure 11:
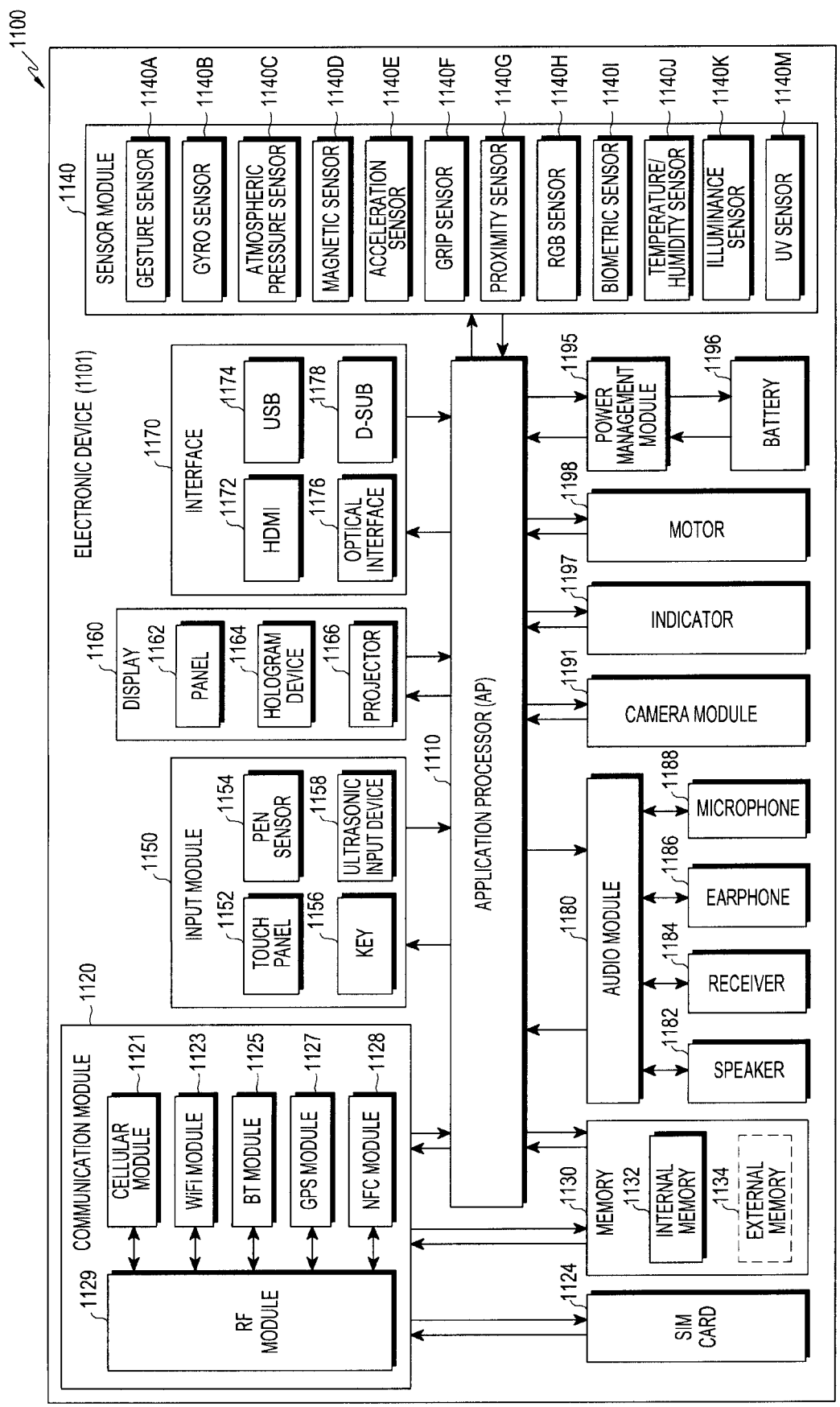
FIG. 11 is a block diagram of an example of an electronic device according to an embodiment of the present disclosure.

FIG. 11 is a block diagram 1100 of an example of an electronic device 1101 according to various embodiments of the present disclosure. The electronic device 1101 may include, for example, all or some of the components of the electronic device 101 shown in FIG. 1. The electronic device 1101 may include one or more APs 1110, a communication module 1120, an SIM (Subscriber Identification Module) card 1124, a memory 1130, a sensor module 1140, an input device 1150, a display 1160, an interface 1170, an audio module 1180, a camera module 1191, a power management module 1195, a battery 1196, an indicator 1197, and a motor 1198.

The AP 1110 may drive, for example, an OS or an application program to control a plurality of hardware or software components connected to the AP 1110, and execute processing and operations of a variety of data. The AP 1110 may be implemented as, for example, a SoC (System on Chip). According to an embodiment, the AP 1110 may further include a GPU (Graphic Processing Unit) and/or an image signal processor. The AP 1110 may include at least a part (e.g., a cellular module 1121) of the components shown in FIG. 11. The AP 1110 may load a command or data received from at least one of other components (e.g., a non-volatile memory) to a volatile memory, and store a variety of data in the non-volatile memory.

The communication module 1120 may have an identical or similar configuration to that of the communication interface 160 of FIG. 1. The communication module 1120 may include, for example, the cellular module 1121, a Wi-Fi module 1123, a BT module 1125, a GPS module 1127, an NFC module 1128, and an RF (Radio Frequency) module 1129.

The cellular module 1121 may provide, for example, a voice call, a video call, an SMS (Short Messaging Service) service, an Internet service, and the like over a communications network. According to an embodiment, the cellular module 1121 may identify and authenticate the electronic device 1101 in a communication network by using a subscriber identification module (e.g., the SIM card 1124). According to an embodiment, the cellular module 1121 may perform at least a part of functions that may be provided by the AP 1110. According to an embodiment, the cellular module 1121 may include a CP (Communication Processor).

Each of the Wi-Fi module 1123, the BT module 1125, the GPS module 1127, or the NFC module 1128 may include, for example, a processor for processing data transmitted and received via the corresponding module. According to some embodiments, at least a part (e.g., two or more) of the cellular module 1121, the Wi-Fi module 1123, the BT module 1125, the GPS module 1127, and the NFC module 1128 may be included in a single IC (Integrated Chip) or an IC package.

The RF module 1129 may transmit and receive, for example, a communication signal (e.g., RF signal). The RF module 1129 may include, for example, a transceiver, a PAM (Power Amp Module), a frequency filter, an LNA (Low Noise Amplifier), an antenna, or the like. According to another embodiment, at least one of the cellular module 1121, the Wi-Fi module 1123, the BT module 1125, the GPS module 1127, and the NFC module 1128 may transmit and receive the RF signal via a separate RF module.

The SIM card 1124 may include, for example, a card and/or embedded SIM including a subscriber identification module, unique identification information (e.g., ICCID (Integrated Circuit Card Identifier)), or subscriber information (e.g., IMSI (International Mobile Subscriber Identity)).

The memory 1130 (e.g., the memory 130) may include, for example, an internal memory 1132 or an external memory 1134. The internal memory 1132 may include at least one of, for example, a volatile memory (e.g., DRAM (Dynamic RAM), SRAM (Static RAM), SDRAM (Synchronous Dynamic RAM), or the like) and a non-volatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, flash memory (e.g., NAND flash, NOR flash, or the like), hard drive, or SSD (Solid State Drive)).

The external memory 1134 may further include a flash drive, for example, CF (Compact Flash), SD (Secure Digital), Micro-SD (Micro Secure Digital), Mini-SD (Mini Secure Digital), Xd (eXtreme Digital), a memory stick, or the like. The external memory 1134 may be functionally and/or physically connected to the electronic device 1101 through a variety of interfaces.

The sensor module 1140 may measure a physical quantity or sense an operation state of the electronic device 1101, and convert the measured or sensed information into an electrical signal. The sensor module 1140 may include, for example, a gesture sensor 1140A, a gyro sensor 1140B, an atmospheric pressure sensor 1140C, a magnetic sensor 1140D, an accelerometer 1140E, a grip sensor 1140F, a proximity sensor 1140G, a color sensor (e.g., RGB (Red, Green, Blue) sensor) 1140H, a biometric sensor 11401, a temperature/humidity sensor 1140J, an illuminance sensor 1140K, and an UV (Ultra Violet) sensor 1140M. Additionally or alternatively, the sensor module 1140 may include, for example, an E-nose sensor, an EMG (electromyography) sensor, an EEG (electroencephalogram) sensor, an ECG (electrocardiogram) sensor, an IR (infrared) sensor, an iris sensor, and/or a fingerprint sensor. The sensor module 1140 may further include a control circuit for controlling one or more sensors included therein. According to some embodiments, the electronic device 1101 may further include a processor configured to control the sensor module 1140 as a part of or separately from the AP 1110, and thereby control the sensor module 1140 while the AP 1110 is in a sleep state.

The input device 1150 may include, for example, a touch panel 1152, a (digital) pen sensor 1154, a key 1156, or an ultrasonic input device 1158. The touch panel 1152 may use at least one of, for example, a capacitive method, a decompression method, an infrared method, and an ultrasonic method. In addition, the touch panel 1152 may further include a control circuit. The touch panel 1152 may further include a tactile layer, and provide a tactile response to a user.

The (digital) pen sensor 1154 may include, for example, a sheet for recognition which is a part of or separate from the touch panel. The key 1156 may include, for example, a physical button, an optical key, or a keypad. The ultrasonic input device 1158 may detect sound waves using a microphone (e.g., a microphone 1188) and identify data in the electronic device 1101, through an input tool that generates an ultrasonic signal.

The display 1160 (e.g., the display 160) may include a panel 1162, a hologram device 1164, or a projector 1166. The panel 1162 may include, for example, an identical or similar configuration to that of the display 160 of FIG. 1. The panel 1162 may be, for example, flexible, transparent, or wearable. The panel 1162 may constitute one module together with the touch panel 1152. The hologram device 1164 may show a three-dimensional (3D) image in the air by using light interference. The projector 1166 may display an image by projecting light onto a screen. The screen may be located, for example, inside or outside the electronic device 1101. According to an embodiment, the display 1160 may further include a control circuit for controlling the panel 1162, the hologram device 1164, or the projector 1166.

The interface 1170 may include, for example, an HDMI (High-Definition Multimedia Interface) 1172, a USB (Universal Serial Bus) 1174, an optical interface 1176, or a D-sub (D-subminiature) 1178. The interface 1170 may be included in, for example, the communication interface 160 shown in FIG. 1. Additionally or alternatively, the interface 1170 may include an MHL (Mobile High-definition Link) interface, an SD card/MMC (Multi-Media Card) interface, or an IrDA (infrared data association) standard interface.

The audio module 1180 may convert sound and electrical signals in a two-way direction. At least some components of the audio module 1180 may be included in, for example, the I/O interface 150 shown in FIG. 1. The audio module 1180 may process sound information input or output by, for example, a speaker 1182, a receiver 1184, earphones 1188, or the microphone 1188.

The camera module 1191 may be a device that can take, for example, still and moving images, and according to an embodiment, may include one or more image sensors (e.g., a front sensor or a rear sensor), a lens, an ISP (Image Signal Processor), or a flash (e.g., LED or xenon lamp).

The power management module 1195 may manage, for example, the power supply of the electronic device 1101. According to an embodiment, the power management module 1195 may include a PMIC (Power Management Integrated Circuit), a charger IC, or a battery or fuel gauge. The PMIC may have a wired and/or wireless charging method. The wireless charging method may include, for example, a magnetic resonance charging method, a magnetic induction charging method, or an electromagnetic charging method, and further include an additional circuit for wireless charging, for example, a coil loop, a resonance circuit, a rectifier, or the like. The battery gauge may measure, for example, a residual capacity, a voltage in charging, a current, or a temperature of the battery 1196. The battery 1196 may include, for example, a rechargeable battery and/or a solar battery.

The indicator 1197 may display a specific state of the electronic device 1101 or a part thereof (e.g., the AP 1110), for example, a boot-up state, a message state, or a charging state. The motor 1198 may convert an electrical signal into a mechanical vibration, and generate vibration or haptic effects. Although not shown, the electronic device 1101 may include a processing device (e.g., GPU) for supporting a mobile TV. The processing device for supporting the mobile TV may process, for example, media data according to the standard of DMB (Digital Multimedia Broadcasting), DVB (Digital Video Broadcasting), or media flow.

Each of the components of the electronic device according to the present disclosure may be implemented by one or more components and the name of the corresponding component may vary depending on a type of the electronic device. In various embodiments, the electronic device may include at least one of the above-described elements. Some of the above-described elements may be omitted from the electronic device, or the electronic device may further include additional elements. Further, some of the elements of the electronic device according to various embodiments of the present disclosure may be coupled to form a single entity while performing the same functions as those of the corresponding elements before the coupling.

Figure 12:
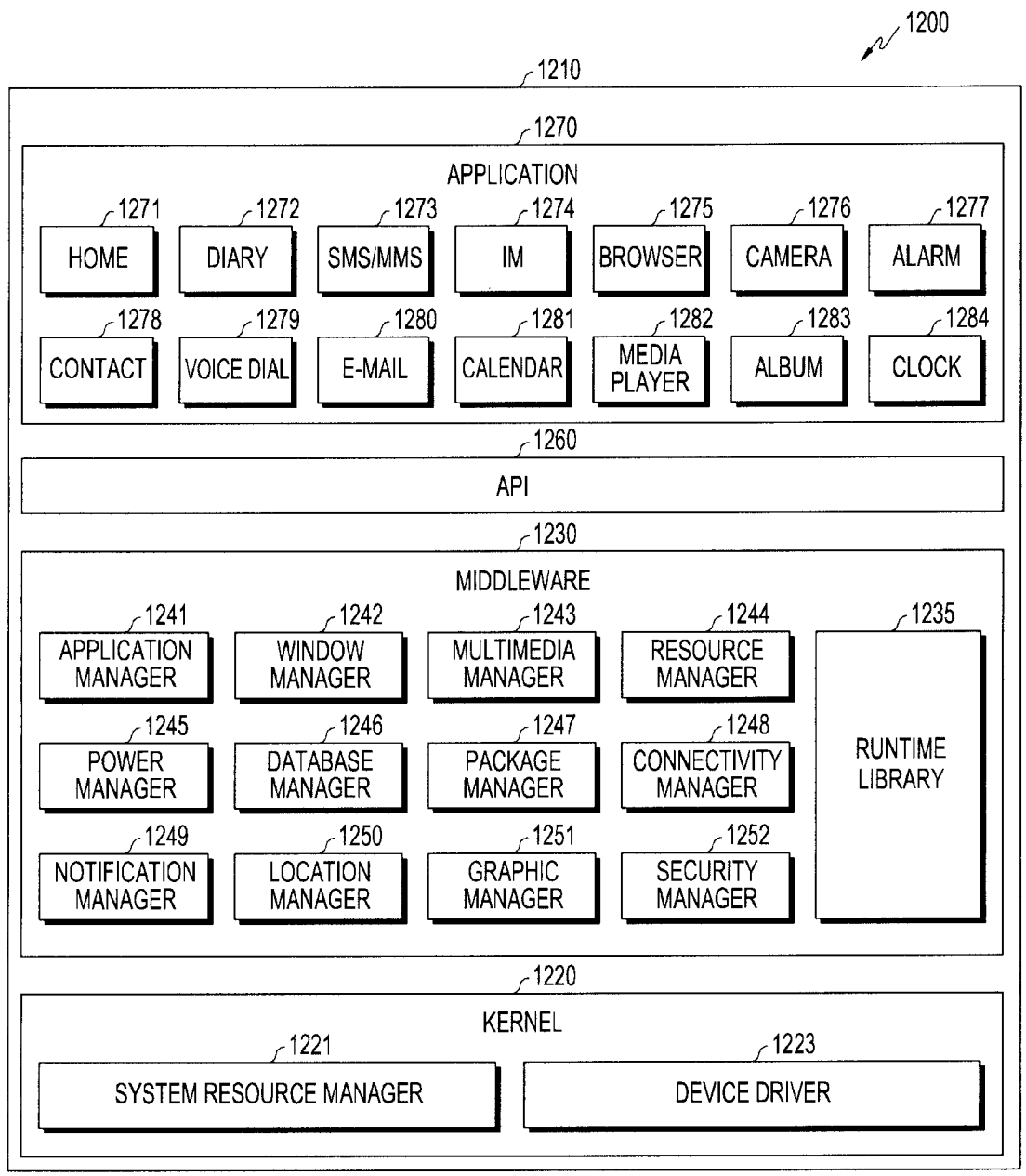
FIG. 12 is a block diagram of an example of a program module according to various embodiments of the present disclosure.

FIG. 12 is a block diagram of an example of a program module 1210 according to various embodiments of the present disclosure. According to an embodiment, the program module 1210 (e.g., the program 140) may include an OS for controlling resources associated with an electronic device (e.g., the electronic device 101) and/or a variety of applications (e.g., the application program 147) driven on the OS. The OS may be, for example, Android, iOS, Windows, Symbian, Tizen, Bada, or the like.

The program module 1210 may include a kernel 1220, a middleware 1230, an API (Application Programming Interface) 1260, and/or an application 1270. At least a part of the program module 1210 may be preloaded on the electronic device, or downloaded from a server (e.g., the server 106).

The kernel 1220 (e.g., the kernel 141 of FIG. 1) may include, for example, a system resource manager 1221 or a device driver 1223. The system resource manager 1221 may perform control, allocation, recovery, or the like of the system resource. According to an embodiment, the system resource manager 1221 may include a process management unit, a memory management unit, a file system management unit, or the like. The device driver 1223 may include, for example, a display driver, a camera driver, a Bluetooth driver, a shared memory driver, a USB driver, a keypad driver, a Wi-Fi driver, an audio driver, or an IPC (Inter-Process Communication).

The middleware 1230 may provide, for example, functions which the application 1270 needs in common, or provide various functions to the application 1270 via the API 1260 so that the application 1270 may efficiently use limited system resources in the electronic device. According to an embodiment, the middleware 1230 (e.g., the middleware 143) may include at least one of a runtime library 1235, an application manager 1241, a window manager 1242, a multimedia manager 1243, a resource manger 1244, a power manager 1245, a database manager 1246, a package manager 1247, a connectivity manager 1248, a notification manager 1249, a position manager 1250, a graphic manager 1251, and a security manager 1252.

The runtime library 1235 may include, for example, a library module used by a compiler to add a new function via a programming language while the application 1270 is executed. The runtime library 1235 may perform input and output management, memory management, or an arithmetic function.

The application manager 1241 may manage, for example, a life cycle of at least one of the applications 1270. The window manager 1242 may manage GUI resources used on a screen. The multimedia manager 1243 may identify a format required for reproducing various media files, and encode or decode a media file using a codec corresponding to the corresponding format. The resource manager 1244 may manage source codes of at least one of the applications 1270, and resources of a memory or a storage space.

The power manager 1245 may act with, for example, a BIOS (Basic Input/Output System) or the like to manage a battery or a power source, and provide power information required for the operation of the electronic device. The database manager 1246 may generate, search, or change a database to be used in at least one of the applications 1270. The package manager 1247 may manage installation or update of an application distributed by a type of a package file.

The connection manager 1248 may manage a wireless connection of, for example, Wi-Fi or Bluetooth. The notification manager 1249 may display or notify events of an arrival message, an appointment, and proximity notification by a method which is not disturbed to the user. The position manager 1250 may manage position information of the electronic device. The graphic manager 1251 may manage a graphic effect to be provided to the user or a UI related to the graphic effect. The security manager 1252 may provide all security functions required for system security or user authentication. According to an embodiment, when the electronic device (e.g., the electronic device 101) has a phone function, the middleware 1230 may further include a telephony manager for managing a voice or video call function of the electronic device.

The middleware 1230 may include a middleware module that forms a combination of various functions of the above-described components. The middleware 1230 may provide a module which is specialized for each kind of an OS to provide a differentiated function. In addition, the middleware 1230 may dynamically delete some of the existing components or add new components.

The API 1260 (e.g., the API 145) as a set of API programming functions may be provided as different components according to OSs. For example, in case of Android or iOS, one API set may be provided for each platform, and in case of Tizen, two or more API sets may be provided for each platform.

The application 1270 (e.g., the application program 147) may include, for example, one or more applications which provide functions such as a home 1271, a dialer 1272, an SMS/MMS 1273, an IM (Instant Message) 1274, a browser 1275, a camera 1276, an alarm 1277, a contact 1278, a voice dial 1279, an e-mail 1280, a calendar 1281, a media player 1282, an album 1283, a clock 1284, a health care (e.g., measure a momentum or a blood sugar), environment information providing (e.g., atmospheric pressure, humidity, temperature information, or the like), and the like. According to an embodiment, the application 1270 may include an application (hereinafter "information exchange application") that supports information exchange between the electronic device (e.g., the electronic device 101) and the external device (e.g., the electronic devices 102 and 104). The information exchange application may include, for example, a notification relay application for relaying specific information to the external device or a device management application for managing the external device.

For example, the notification relay application may include a function for relaying, to the external device (e.g., the electronic devices 102 and 104), notification information generated from the other applications (e.g., the SMS/MMS application, the e-mail application, the health care application, or the environment information application) of the electronic device. In addition, the notification relay application may receive, for example, notification information from the external device, and provide the received notification information to the user. The device management application may manage (install, delete, or update), for example, one or more functions (e.g., turn on/turn-off of the external device itself (or some components) or adjustment of brightness (or resolution) of a display) of the external device (e.g., the electronic device 104) communicating with the electronic device, applications operated in the external device, or services (e.g., call service or message service) provided from the external device.

According to an embodiment, the application 1270 may include an application (e.g., health care application) designated according to attributes (e.g., the type of the electronic device is a mobile medical device, as the attribute of the electronic device) of the external device (e.g., the electronic devices 102 and 104). According to an embodiment, the application 1270 may include an application received from the external device (e.g., the server 106 or the electronic devices 102 and 104). According to an embodiment, the application 1270 may include a preloaded application or a third-party application capable of being downloaded from the server. Names of the components of the program module 1210 according to the shown embodiment may be changed according to the types of the OSs.

According to various embodiments, at least a part of the programming module 1210 may be implemented in software, firmware, hardware, or a combination of two or more thereof. At least some of the programming module 1210 may be implemented (for example, executed) by, for example, the processor (for example, the AP 1110). At least some of the programming module 1210 may include, for example, a module, program, routine, sets of instructions, or process for performing one or more functions.

The term "module" or "functional unit" used herein may, for example, mean a unit including one of hardware, software, and firmware or a combination of two or more of them. The "module" may be interchangeably used with, for example, the term "unit", "logic", "logical block", "component", or "circuit". The "module" or "function unit" may be a minimum unit of an integrated component element or a part thereof. The "module" may be a minimum unit for performing one or more functions or a part thereof. The "module" or "function unit" may be mechanically or electronically implemented. For example, the "module" or "function unit" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When he command is executed by one or more processors (for example, the processor 120), the one or more processors may execute a function corresponding to the command. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high-class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above-described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

According to various embodiments, in a storage medium that stores instructions, the instructions may be set to enable one or more processors to perform one or more operations when being executed by the one or more processors, the one or more operations including: measuring a speed by a speed measurement module; receiving speed information from an external device; calculating one or more correction parameters based on the received speed information and the measured speed; and adjusting the speed measured by the speed measurement module using the calculated correction parameter.

In addition, the one or more operations which are set to be performed by the processor may include: measuring a speed by a first sensor of a first speed measurement module; measuring a speed by a second sensor of a second speed measurement module; calculating one or more correction parameters based on the speed measured by the first sensor and the speed measured by the second sensor; and adjusting the speed measured by at least one of the first sensor and the second sensor using the calculated correction parameter.

FIGS. 1-12 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. An electronic device comprising:
 a display;

an accelerometer;
a communication unit;
at least one processor; and
a memory storing instructions executable by the at least one processor to cause the electronic device to:
pair the electronic device with an external device configured to receive global positioning satellite (GPS) information,
obtain, using the accelerometer, a first measurement associated with a movement of the electronic device over a first distance,
receive, from the external device using the communication unit, a second measurement, detected by the external device based on the GPS information, corresponding to the movement of the electronic device over the first distance while the electronic device is paired with the external device,
obtain, using the accelerometer, a third measurement associated with a movement of the electronic device over a second distance,
receive, from the external device using the communication unit, a fourth measurement, detected by the external device based on the GPS information, corresponding to the movement of the electronic device over the second distance while the electronic device is paired with the external device,
calculate a correction parameter based on the first measurement, the second measurement, the third measurement, and the fourth measurement, and
after the electronic device is unpaired with the external device, obtain, using the accelerometer, a fifth measurement associated with a movement of the electronic device over a third distance and display a sixth measurement associated with the movement of the electronic device over the third distance on the display,
wherein the sixth measurement, associated with the movement of the electronic device over the third distance, is generated by applying the correction parameter on the fifth measurement.

2. The electronic device of claim 1, wherein the first measurement and the third measurement comprise at least a speed of the electronic device.

3. The electronic device of claim 1, wherein the electronic device comprises a wearable device.

4. The electronic device of claim 1, wherein the external device comprises a smartphone.

5. The electronic device of claim 1, wherein the fifth measurement includes a speed of the electronic device.

6. The electronic device of claim 1, wherein the correction parameter is applied to the fifth measurement when the electronic device is unpaired from the external device such that GPS-enabled measurements are unavailable to the electronic device.

7. A method in an electronic device, comprising:
pairing the electronic device with an external device by a communication unit, the external device configured to receive global positioning satellite (GPS) information;
obtaining, using an accelerometer of the electronic device, a first measurement associated with a movement of the electronic device over a first distance;
receiving, from the external device using the communication unit, a second measurement, detected by the external device based on the GPS information, corresponding to the movement of the electronic device over the first distance while the electronic device is paired with the external device;
obtaining, using the accelerometer, a third measurement associated with a movement of the electronic device over a second distance,
receiving, from the external device using the communication unit, a fourth measurement, detected by the external device based on the GPS information, corresponding to the movement of the electronic device over the second distance while the electronic device is paired with the external device,
calculating a correction parameter based on the first measurement, the second measurement, the third measurement, and the fourth measurement; and
after the electronic device is unpaired with the external device, obtaining, using the accelerometer, a fifth measurement associated with a movement of the electronic device over a third distance and displaying a sixth measurement associated with the movement of the electronic device over the third distance,
wherein the sixth measurement, associated with the movement of the electronic device over the third distance, is generated by applying the correction parameter on the fifth measurement.

8. The method of claim 7, wherein the first measurement and the third measurement comprise at least a speed of the electronic device.

9. The method of claim 7,
wherein the external device comprises a smartphone and the electronic device comprises a wearable device.

10. The method of claim 7, wherein the fifth measurement includes a speed of the electronic device.

11. The method of claim 7, wherein the correction parameter is applied to the fifth measurement when the electronic device is unpaired from the external device such that GPS-enabled measurements are unavailable to the electronic device.

12. A non-transitory computer-readable medium storing one or more processor-executable instructions executable by at least one processor of an electronic device to cause the at least one processor to:
pair the electronic device to an external device using a communication unit, the external device configured to receive global positioning satellite (GPS) information;
obtain, using an accelerometer of the electronic device, a first measurement associated with a movement of the electronic device over a first distance;
receive, from the external device by the communication unit, a second measurement, detected by the external device based on the GPS information corresponding to the movement of the electronic device over the first distance while the electronic device is paired with the external device;
obtain, using the accelerometer, a third measurement associated with a movement of the electronic device over a second distance;
receive, from the external device using the communication unit, a fourth measurement, detected by the external device based on the GPS information, corresponding to the movement of the electronic device over the second distance while the electronic device is paired with the external device;
calculate a correction parameter based on the first measurement, the second measurement, the third measurement, and the fourth measurement; and
after the electronic device is unpaired with the external device, obtain, using the accelerometer, a fifth measurement associated with the movement of the electronic device over a third distance and display a sixth measurement associated with the movement of the electronic device over the third distance, wherein the sixth measurement, associated with the movement of the electronic device over the third distance, is generated by applying the correction parameter on the fifth measurement.

13. The electronic device of claim 12, wherein the at least one processor is further configured to:

receive, via the communication unit, the correction parameter from the external device.

* * * * *